United States Patent
Gatto et al.

(10) Patent No.: US 7,350,468 B2
(45) Date of Patent: Apr. 1, 2008

(54) ADJUSTABLE SPACER FOR FREIGHT CAR

(75) Inventors: Mario D. Gatto, Grimsby (CA); Robert David Vial, Hamilton (CA); Michael Hugh Nicholson, Jr., Hamilton (CA)

(73) Assignee: National Steel Car Ltd., Hamilton, Ontario (CA)

( * ) Notice: Subject to any disclaimer, the term of this patent is extended or adjusted under 35 U.S.C. 154(b) by 0 days.

(21) Appl. No.: 11/452,622

(22) Filed: Jun. 14, 2006

(65) Prior Publication Data

US 2006/0230977 A1 Oct. 19, 2006

Related U.S. Application Data

(63) Continuation of application No. 10/874,616, filed on Jun. 23, 2004, now Pat. No. 7,117,801.

(51) Int. Cl.
*B61D 45/00* (2006.01)
(52) U.S. Cl. ............... 105/355; 410/143; 410/144; 410/150
(58) Field of Classification Search ......... 105/400, 105/401, 402, 409, 410; 410/143, 144, 146, 410/147, 148, 149, 152, 150, 126, 130, 131, 410/132, 133, 134, 135, 136, 137, 138, 139; 16/87.6 R
See application file for complete search history.

(56) References Cited

U.S. PATENT DOCUMENTS

| | | | | |
|---|---|---|---|---|
| 2,229,888 A | * | 1/1941 | Fraser | 105/410 |
| 3,382,817 A | * | 5/1968 | Taylor | 105/410 |
| 3,402,680 A | * | 9/1968 | Hyatt | 410/149 |
| 3,680,491 A | | 8/1972 | Chapman et al. | |
| 3,709,157 A | * | 1/1973 | Snyder et al. | 105/409 |
| 3,722,429 A | | 3/1973 | Holt et al. | |
| 3,769,917 A | | 11/1973 | Snyder et al. | |
| 3,774,552 A | | 11/1973 | Snyder et al. | |
| 3,782,295 A | * | 1/1974 | Balinksi | 410/149 |
| 3,788,240 A | * | 1/1974 | Nadherny | 410/102 |
| 3,799,070 A | * | 3/1974 | Munson | 410/149 |
| 3,842,756 A | | 10/1974 | Marulic | |
| 3,850,113 A | | 11/1974 | Sichak | |
| 3,853,071 A | | 12/1974 | Snyder et al. | |
| 4,033,268 A | * | 7/1977 | Klekar | 410/149 |
| 4,062,297 A | | 12/1977 | Snyder et al. | |
| 4,074,634 A | | 2/1978 | Snow et al. | |

(Continued)

*Primary Examiner*—Mark T. Le
(74) *Attorney, Agent, or Firm*—Carlson, Gaskey & Olds

(57) ABSTRACT

A box car includes end walls joined to opposing side walls that define the interior cargo area. Each end wall includes a corrugated side that faces the cargo area. The adjustable spacer is arranged within a cavity in the corrugated side in a stowed position so that it does not protrude into the cargo area. The side walls include tracks in which opposing guides that support the lateral beam are slideably received. The tracks do not protrude into the cargo area. The guides include multiple holes providing keyways that receive removable locks. Vertical side posts are arranged along the exterior of the side walls. Holes are arranged in the side walls in the area of the side posts. The locks are received in one of the holes in the guides and a hole in the side wall to lock the adjustable spacer in the desired position relative to the box car.

1 Claim, 6 Drawing Sheets

U.S. PATENT DOCUMENTS

| | | |
|---|---|---|
| 4,085,685 A | 4/1978 | Stone |
| 4,091,745 A * | 5/1978 | Patch .................. 410/146 |
| 4,266,897 A | 5/1981 | Jensen |
| 4,566,831 A | 1/1986 | Groth |
| 4,982,922 A | 1/1991 | Krause |
| 5,370,482 A | 12/1994 | Long |
| 5,386,674 A | 2/1995 | Sfirakis et al. |
| 5,788,439 A | 8/1998 | Duffell |
| 5,802,984 A | 9/1998 | Thoman et al. |
| 6,074,143 A * | 6/2000 | Langston et al. ............. 410/89 |
| 6,138,578 A * | 10/2000 | Cowan et al. .............. 105/355 |
| 6,138,580 A * | 10/2000 | Thoman ..................... 105/396 |
| 6,402,446 B1 | 6/2002 | Nadherny et al. |
| 6,722,829 B2 * | 4/2004 | Williams .................... 410/139 |
| 7,117,801 B2 * | 10/2006 | Gatto et al. ................. 105/404 |
| 2002/0012576 A1 * | 1/2002 | Anderson .................. 410/106 |

\* cited by examiner

ADJUSTABLE SPACER FOR FREIGHT CAR

This application is a continuation of U.S. patent application Ser. No. 10/874,616, filed on Jun. 23, 2004 now U.S. Pat. No. 7,117,801.

BACKGROUND OF THE INVENTION

This invention relates to adjustable cargo spacers and a method of using the same. The inventive cargo spacers are suitable for auto parts box cars, and could be used advantageously to secure loads in other freight cars or truck transport.

Rail cars such as box cars transport lading arranged within an enclosed cargo area. Specialized freight cars such as those used to transport auto parts use racks on which these auto parts are secured. Rack sizes vary to suit various sizes of auto parts and are loaded into the cargo area of a freight car. To prevent shifting of the racks, a wooden rack spacer is applied to an end of the car to fill any remaining space.

When a freight car is first configured to transport the auto parts, the spacer is custom built from lumber to suit the rack sizes and fill any space at the ends of the car. When different auto parts are shipped, different racks are used necessitating a different sized spacer. Removing and rebuilding the spacer is labor intensive, time consuming and expensive.

In addition to the cost and time associated with building and reconfiguring lumber cargo spacers, the weight of the spacers is not included with the freight car as delivered to the customer. The weight of the spacers subsequently must be calculated and accounted for when loading the car and when determining the center of gravity of the freight car.

Numerous adjustable lading restraints for securing cargo have been proposed in the prior art. Prior art cross-members take up space when in a stowed position reducing the available cargo area in which to transport the load. The prior art cross-members are also difficult to adjust with one person because they must be lifted out of the track, or if it is possible to slide the cross-members, the cross-members become misaligned in the tracks.

Another drawback with prior art adjustable cross members is that the locks used to secure the cross members relative to the freight car protrude into the cargo area so that the locks may become damaged, dislodged, or damage the lading. Moreover, prior art locks can be rather complex. Additionally, the holes in which the locks are received tend to be located in weak structural components of the freight car so that the freight car is likely to become damaged if the lading violently collides with or exerts a great force on the rack spacers.

Therefore, what is needed is an adjustable spacer that is reconfigurable, eliminates time and expense of rebuilding, does not reduce or interfere with the cargo area, and is easy to operate by one person.

SUMMARY OF THE INVENTION

The present invention provides a rail car for carrying lading within an interior cargo area. The rail car in the example shown is a box car suitable for transporting auto parts, but can also be used in any suitable car for various cargo. The box car includes end walls joined to opposing side walls that define the interior cargo area. Each end wall includes a corrugated side that faces the cargo area. The corrugated side is constructed using an end sheet with multiple horizontally arranged stiffening members secured to the end sheet providing spaced apart cavities. The inventive adjustable spacers are slideably movable between multiple positions. One of the positions includes a stowed position in which a portion of the spacer, such as a lateral beam, is arranged within one of the cavities. The spacers in the stowed position do not protrude into the cargo area, which would reduce the useable space within the cargo area.

The side walls include tracks in which opposing guides that support the lateral beam are slideably received. The guides are thin, elongated plates of a length that enable one person to slide the spacers along the tracks without the spacers binding in the tracks. The guides have spaced apart downwardly depending legs to reduce the friction between the guides and tracks so that the spacers may be slid more easily.

The guides include multiple holes providing keyways that receive removable locks or keys. Vertical side posts are arranged along the exterior of the side walls. Holes are arranged in the side walls in the area of the side posts. The locks are received in the holes in the guides and the holes in the side walls to lock the adjustable spacers in a desired position relative to the box car. The weight is distributed on the locks such that the locks will rotate to a position under gravity so that the locks will be misaligned with the keyways. The locks are arranged outboard of the rub rails on the side walls so they do not extend into the cargo area.

In this manner, the inventive adjustable spacer is easily reconfigurable, eliminates the expense and time of rebuilding, does not reduce or interfere with the cargo area, and is easy to operate by one person.

These and other features of the present invention can be best understood from the following specification and drawings, the following of which is a brief description.

DETAILED DESCRIPTION OF THE PREFERRED EMBODIMENT

Figure 1:
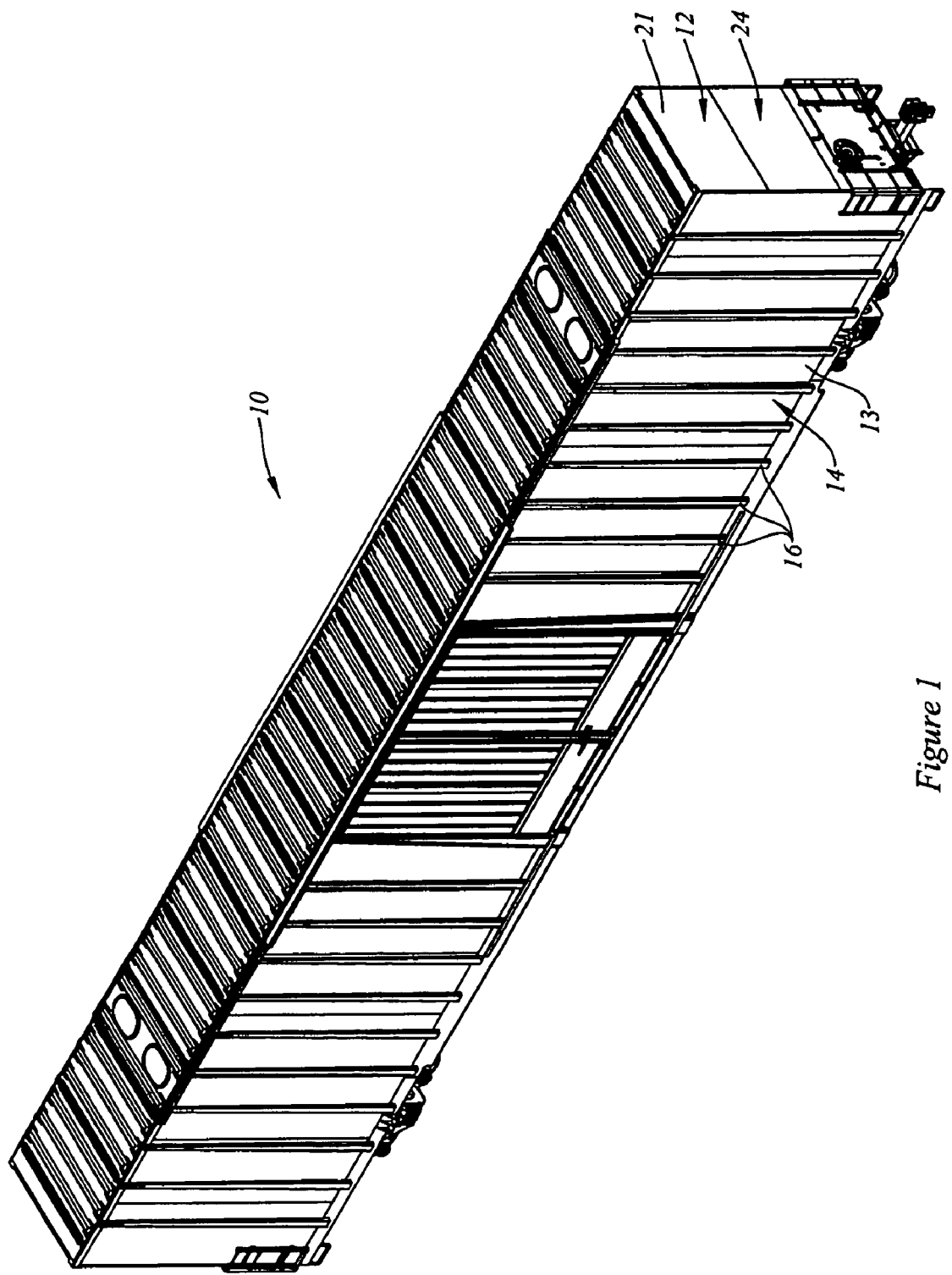
FIG. 1 is a perspective view of a box car.

An inventive box car 10 is shown in FIG. 1. The box car 10 includes end walls 12 and side walls 14 that, in part, define an interior cargo area. The end walls 12 are rotated 180 degrees from a typical prior art box car end wall configuration, as will be better appreciated from the description below.

The side walls 14 include a side sheet 13 reinforced by vertical side posts 16 arranged along the length of the box car 10. The end walls 12 include a flat side 24 and a corrugated side 18, shown in FIG. 2. The corrugated side 18 is provided by an end sheet 21 having horizontal stiffing members 20 secured vertically along the end sheet 21. The stiffing members 20 are spaced apart from one another to form cavities 22. These cavities 22 can be used to provide storage space for items without reducing the available cargo area 17, which is discussed in more detail below. The depth of the cavities 22, in one example, is between 6-8 inches.

The corrugated side 18 faces the interior cargo area 17 instead of the exterior, as is typical in the prior art. While the example shown depicts an end wall 12 constructed from a flat end sheet 21 having U-shaped stiffening members 20 welded to the end sheet 21, other constructions are possible. For example, the end sheet 21 may be deformed to provide the corrugations and/or corrugations may also be provided on the exterior of the end wall 12 in addition to the corrugation at the interior.

The side walls 14 include rub rails 26 spaced vertically from one another. The rub rails 26 protect the side walls 14 from damage from lading C, which is shown in phantom. The inventive spacers 28 are arranged in various desired positions within the interior cargo area 17 to locate the lading C in a desired position and prevent the lading C from shifting during transport.

Figure 6:
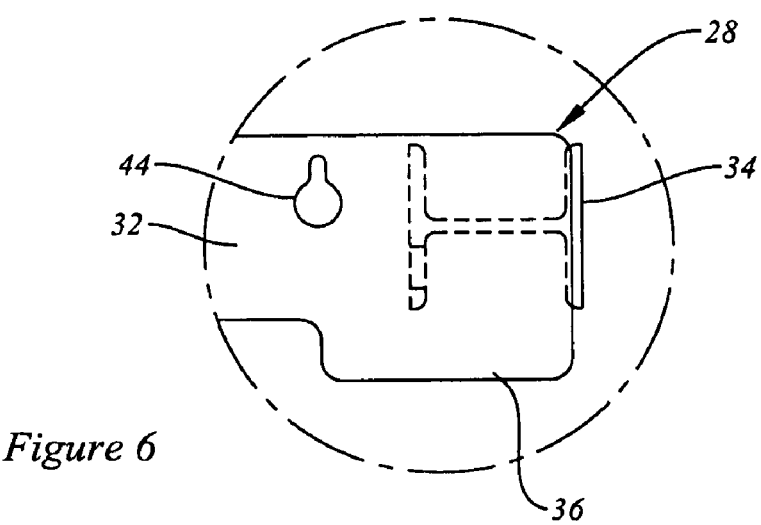
FIG. 6 is an enlarged end view of a portion of the spacer shown in FIG. 5.

In an example embodiment of the invention, vertically spaced tracks 30 are secured to the side walls 14 to slideably support the spacers 28. The spacers 28 include longitudinal guides 32 that support lateral beams 34 that are arranged transverse to the spaced apart guides 32. The lateral beams 34 include apertures 35 that are used to position the spacers either manually or by the use of a hook and chain (not shown) attached to a fork lift. Each lateral beam 34 includes an H-shaped cross-section (shown in FIG. 6) to better withstand horizontal loading.

Figure 2:
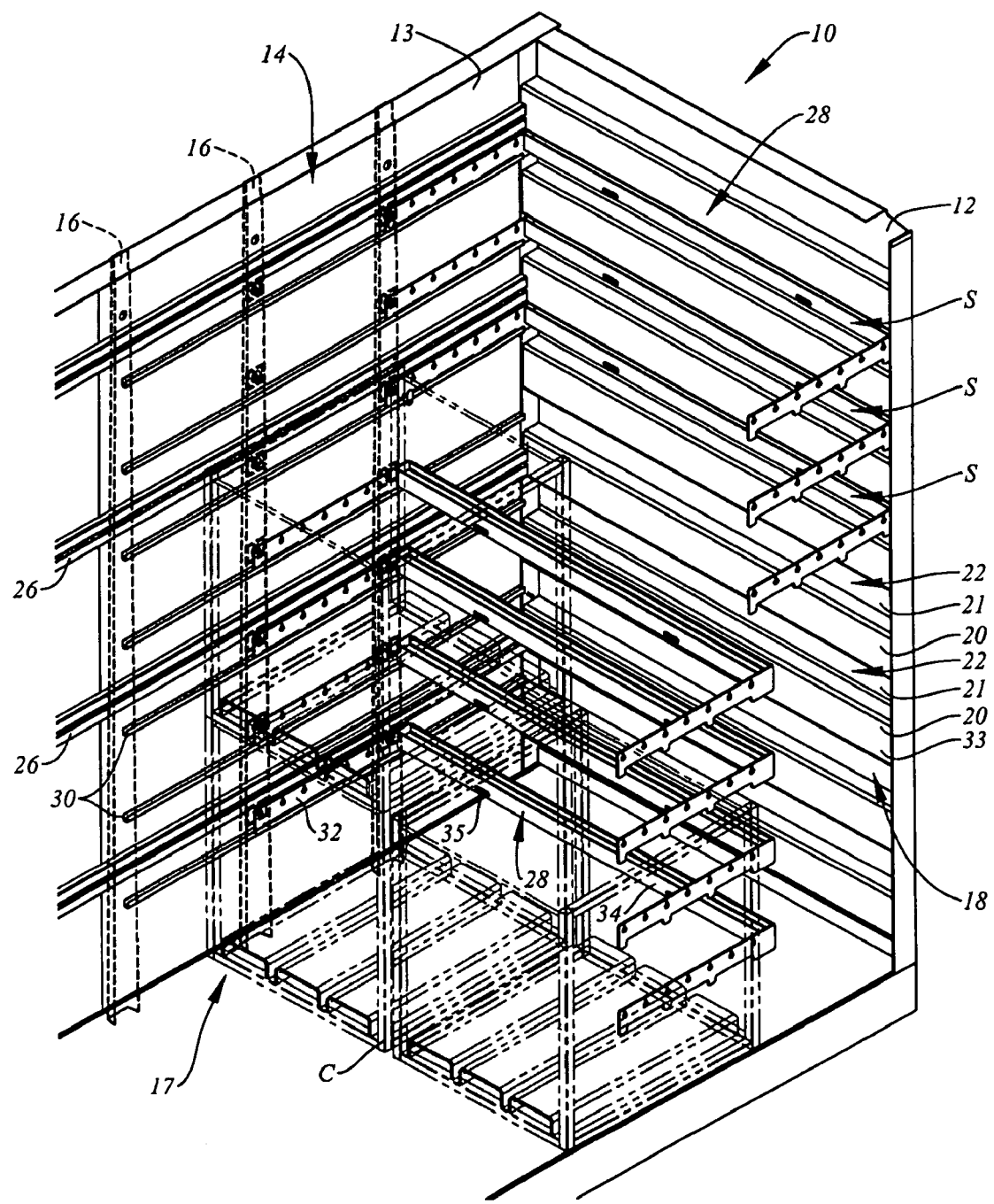
FIG. 2 is a perspective view of an interior cargo area, which utilizes the inventive adjustable spacers.
Figure 3:
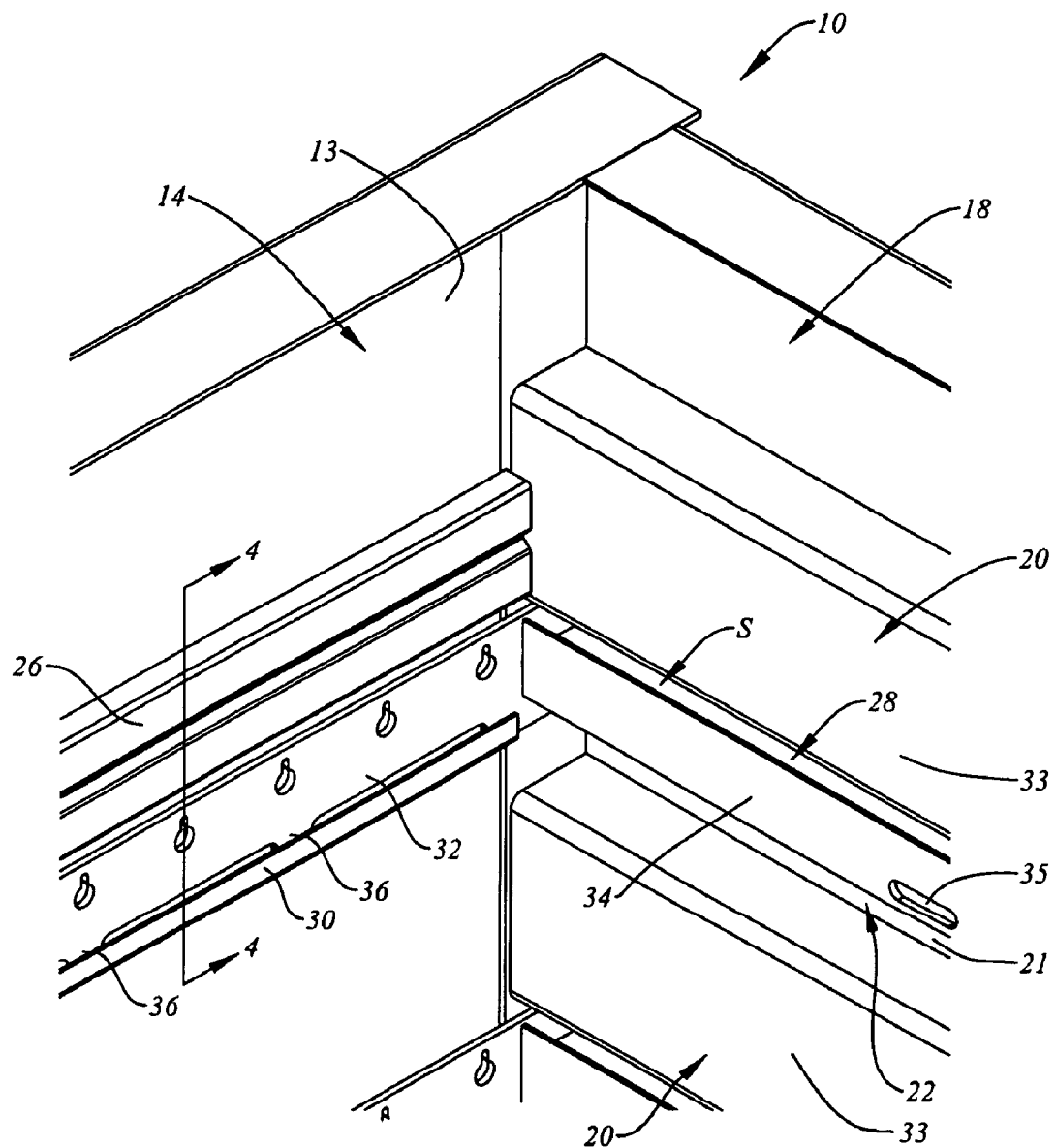
FIG. 3 is an enlarged view of a portion of FIG. 2.

Referring to FIGS. 2 and 3, the lateral beams 34 are received in the cavities 22 in a stowed position S so that the spacers 28 do not reduce the usable space of the cargo area 17. Arranging the spacers 28 in the stowed position S also prevents damage to the spacers 28 or lading C since they do not extend into the cargo area 17 in this position. Preferably, the lateral beams 34 are arranged outboard of inner surfaces 33 of the stiffening members 20 in the stowed position S. That is, the lateral beams 34 are arranged between a plane defined by the inner surfaces 33 and the end sheet 21 in the stowed position S.

Figure 5:
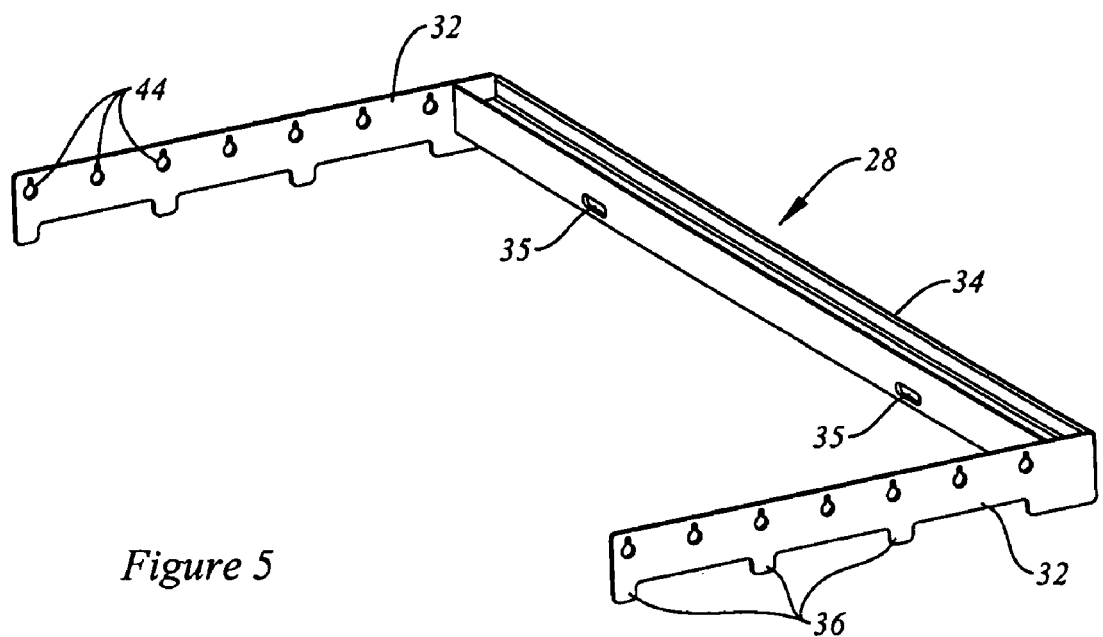
FIG. 5 is a perspective view of the inventive spacer.

The guides 32 include spaced apart legs 36 depending downwardly from the guides 32, best shown in FIG. 5, to reduce the contact area and friction between the guides 32 and tracks 30. The legs 36 are received in channels 38 of the tracks 30, which are defined by opposing sides 40 of the tracks 30. Preferably, the guides 32 and tracks 30 are outboard of an inner surface 42 of the rub rails 26 so that the guides 32 and tracks 30 do not extend into the cargo area 17. More specifically, the guides 32 and tracks 30 are arranged between the side sheet 13 and a plane defined by the inner surfaces 42 of the rub rails 26.

The guides 32 include multiple first holes or keyways 44 arranged along the length of the guides 32. The multiple first holes 44 enable the spacers 28 to be secured in multiple positions relative to the side walls 14. In the example shown, the first holes 44 provide a keyway defined by a circular hole with a notch extending transverse to the circular hole.

Figure 4:
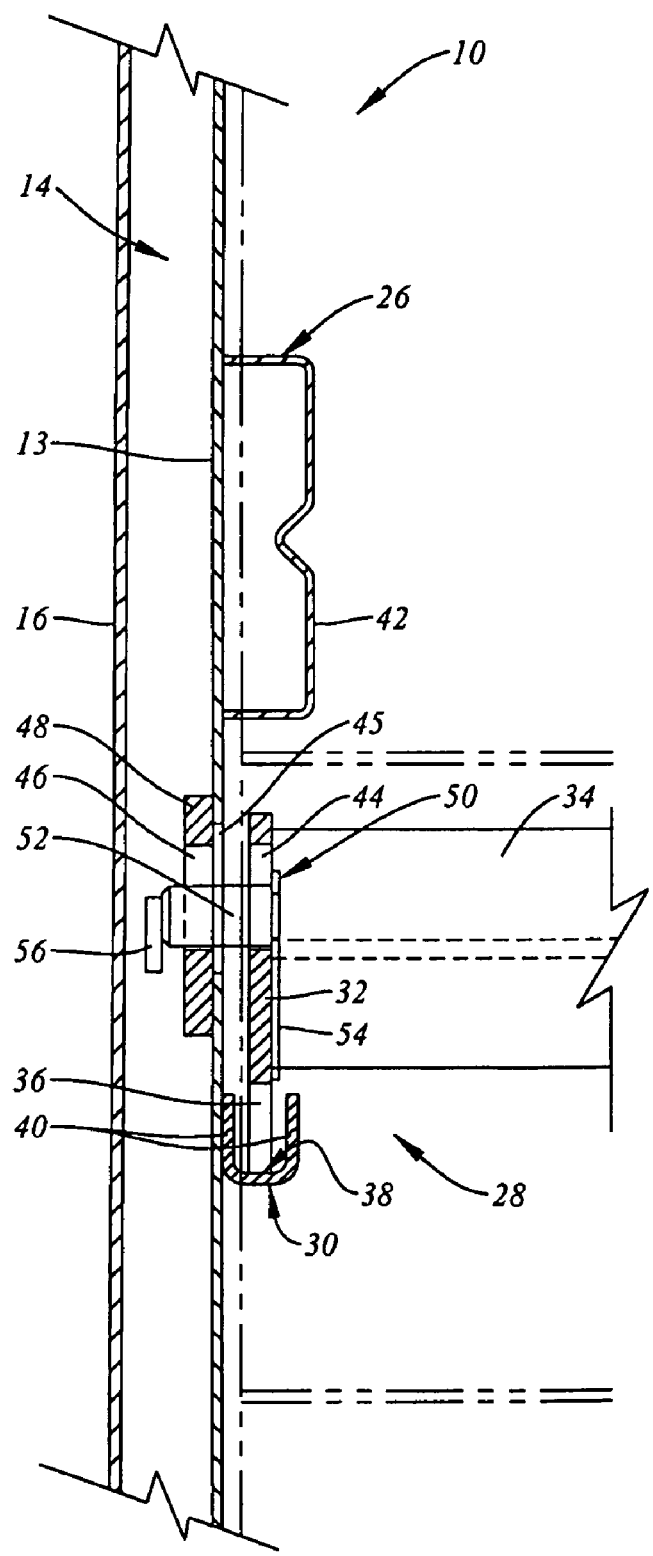
FIG. 4 is a cross-sectional view taken along line 4-4 in FIG. 3.
Figure 7B:
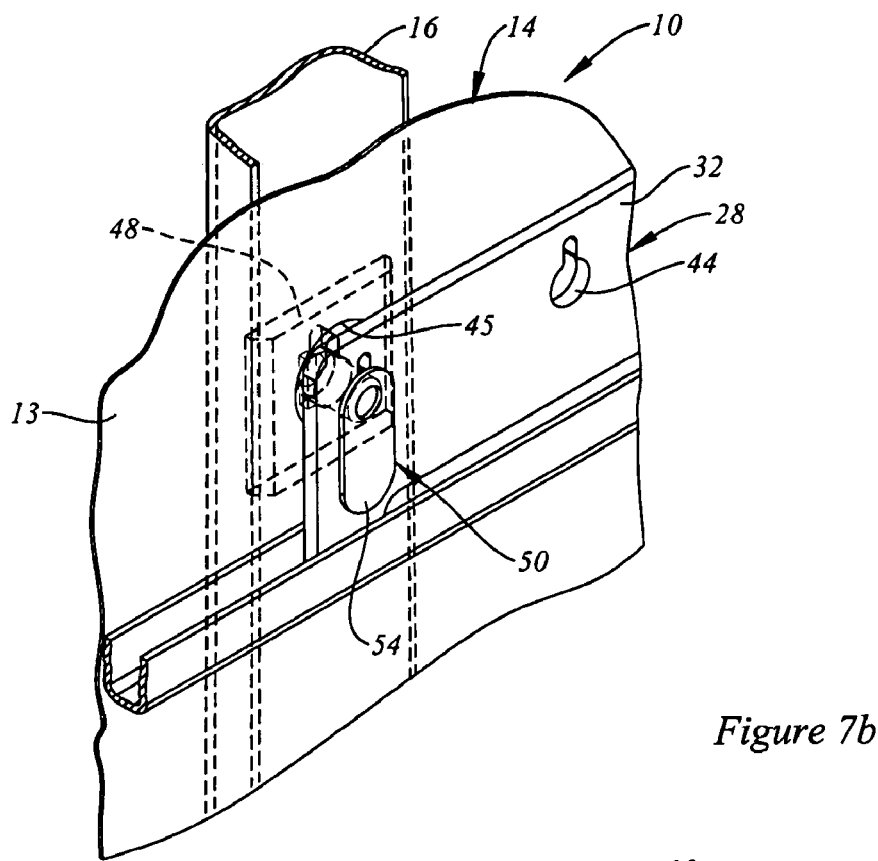
FIG. 7B is an enlarged perspective view similar to that of FIG. 7A, but with the lock in a locked position.
Figure 7A:
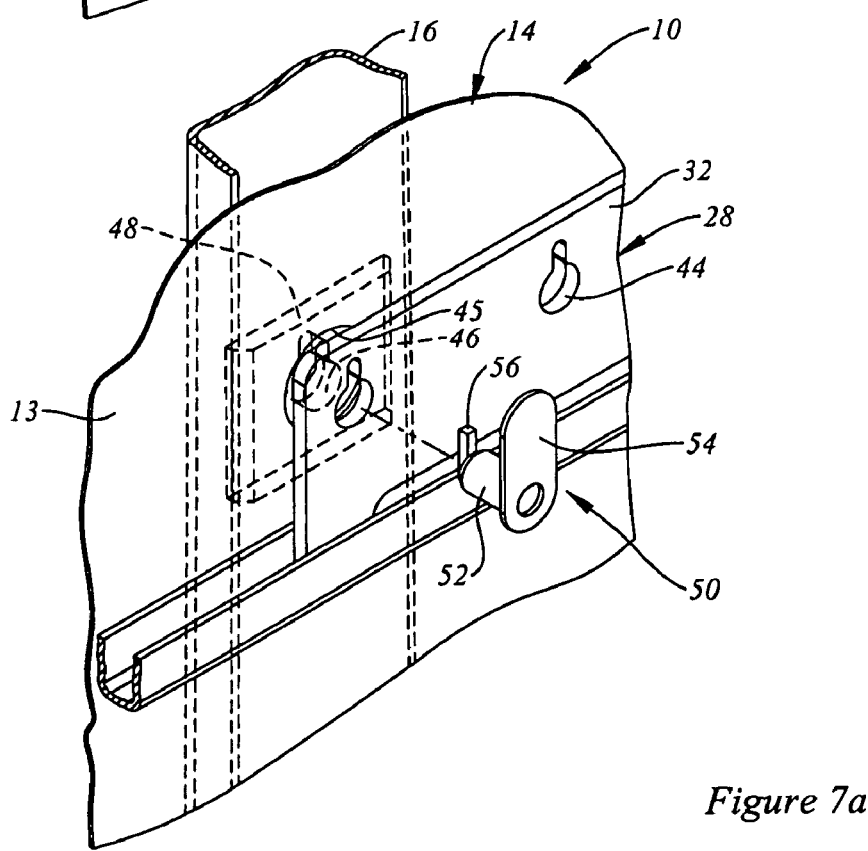
FIG. 7A is an enlarged perspective view of the inventive spacer prior to inserting an inventive lock.

Referring to FIGS. 4 and 7A-7B, reinforcing plates 48 are secured to the side posts 16 such that the side posts 16 enclose the reinforcing plates 48. The reinforcing plates 48 and side posts 16 provide a more structurally sound area for attachment of the spacers 28 than provided by the prior art and is better able to withstand abuse. The reinforcing plates 48 include a second hole or keyway 46 that is in a similar orientation to the first holes 44. The side sheets 13 include an opening 45 that is larger than the second hole 46. Keys or locks 50 are inserted through the first and second holes 44 and 46 and pass through the opening 45 to lock the spacers 28 to the side walls 14.

Each key 50 includes a shaft 52 with a flat handle 54 secured at one shaft end and a tab 56 secured at an opposite shaft end. The tab 56 and shaft 52 are of a shape that enables the key 50 to be inserted into the first and second holes 44 and 46 when the key is in a desired orientation, as shown in FIG. 7A. However, when the key 50 is rotated relative to the desired orientation with the key 50 inserted through the first and second holes 44 and 46, the key 50 is retained in the rack spacer 28 and side wall 14, as shown in FIGS. 4 and 7B.

The key 50 is inserted through the first and second holes 44 and 46 at a rotational position other than a position in which the weight of the key 50 would naturally rotate due to gravity. The handle 54 and tab 56 are configured such that the lock 50 will rotate to a locked position under its own weight, as shown in FIG. 7B. That is, the weight of the key 50 is not distributed evenly about its axis of rotation, but is offset in one direction. If one forgets to rotate the key 50 to the locked position, the key 50 will rotate to the locked position under the force of gravity as the box car vibrates during transport.

As best shown in FIG. 4, the key 50, and in particular the handle 54, is outboard of the inner surfaces 42 provided by the rub rails 26 so that the key 50 does not extend into the cargo area 17, which could damage the key 50 or lading C. That is, the key 50 is arranged between the rub rails 26 and the side sheets 13.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A rail car for carrying lading comprising:
an end wall and side wall providing a cargo area, the side wall including a track;
an adjustable spacer for securing lading, the spacer having a guide slidably supported on the track for movement between multiple positions;
a lock removably securing the guide to the side wall; and
wherein the lock includes a shaft with a handle secured to one shaft end and a tab secured to an opposing shaft end, the handle and tab providing an uneven weight distribution about a lock axis of the shaft, the uneven weight solely urging rotation of the shaft from an unlocked position to a locked position.

* * * * *